July 22, 1930.  H. KASTRUP  1,771,336
COMBINATION OF AN INLET VALVE AND AN EXHAUST
VALVE FOR INTERNAL COMBUSTION MOTORS
Filed June 11, 1928   2 Sheets-Sheet 1

Inventor:
Harry Kastrup.
By H G Fletcher
atty.

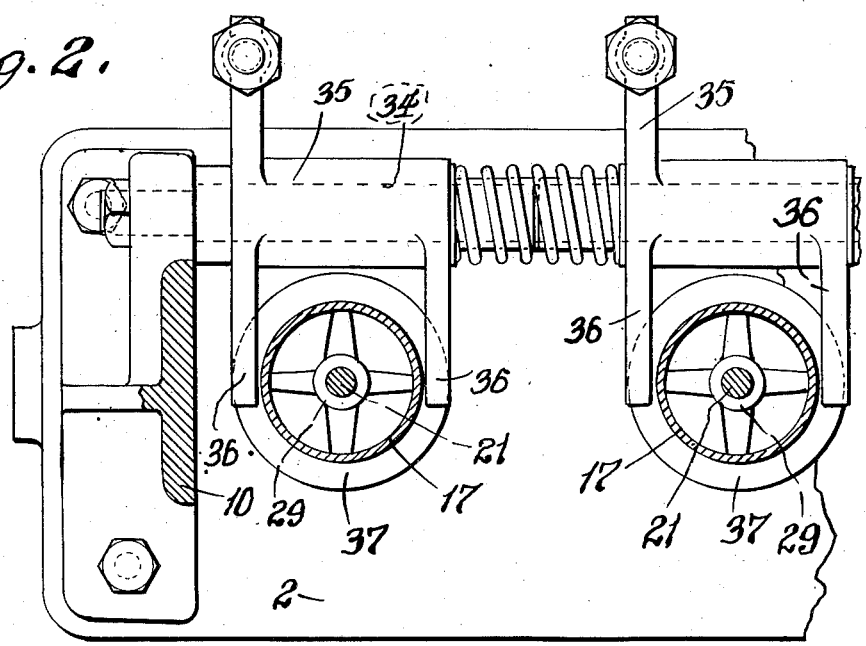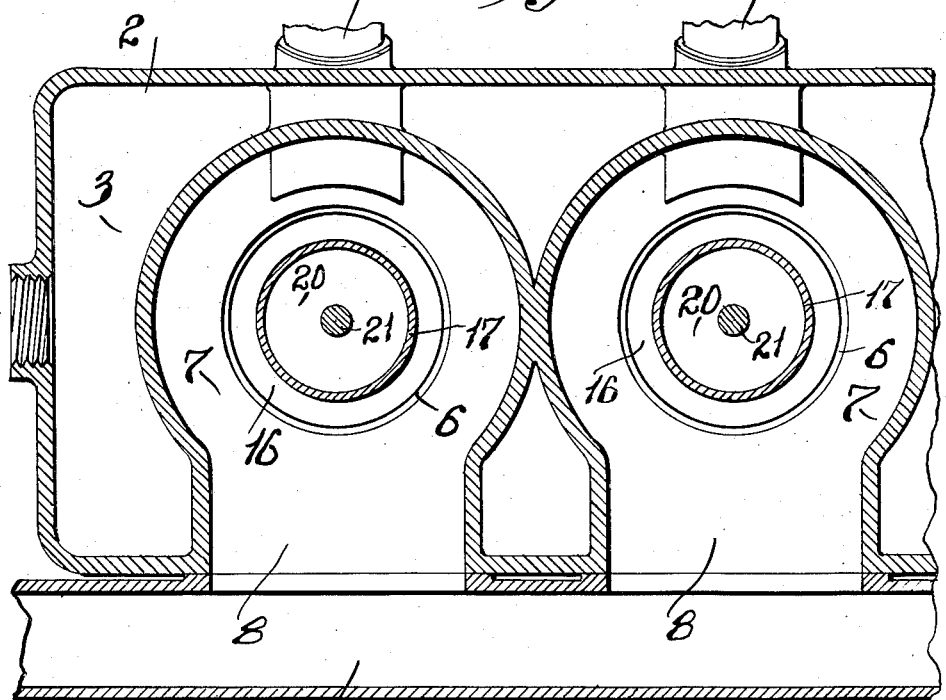

Patented July 22, 1930

1,771,336

UNITED STATES PATENT OFFICE

HARRY KASTRUP, OF ST. LOUIS, MISSOURI, ASSIGNOR OF ONE-THIRD TO HERMAN KASTRUP AND ONE-THIRD TO FRANK B. HALLER, OF ST. LOUIS, MISSOURI

COMBINATION OF AN INLET VALVE AND AN EXHAUST VALVE FOR INTERNAL-COMBUSTION MOTORS

Application filed June 11, 1928. Serial No. 284,363.

This invention relates to improvements in internal combustion motors and pertains more particularly to an improved combination of an inlet valve and an exhaust valve in which provision is made whereby the inlet opening and the exhaust opening of respective valves can be made larger than heretofore.

Another object of the invention is in providing an improved construction of inlet and exhaust valves for a motor whereby an improved relation between the inlet valve and the exhaust valve is brought about.

A further object of the invention is in providing an exhaust valve with means for entrainment therethrough for admitting the gaseous mixture to the cylinder of an internal combustion motor.

A still further object of the invention is in providing the exhaust valve of an internal combustion motor with a valve seat for the inlet valve.

Another still further object of the invention is in nesting the inlet valve with the exhaust valve of an internal combustion motor.

Still another object of the invention is in providing an internal combustion motor with an improved cylinder head and a fuel chest which is separate from the cylinder head.

Other and further objects will appear in the specification and be specifically pointed out in the appended claims, reference being had in the accompanying drawings, exemplifying the invention, and in which:—

Figure 2 is a fragmentary horizontal section taken approximately on the line II—II of Fig. 1.

Figure 3 is a fragmentary horizontal section taken approximately on the line III—III of Fig. 1.

Figure 1:
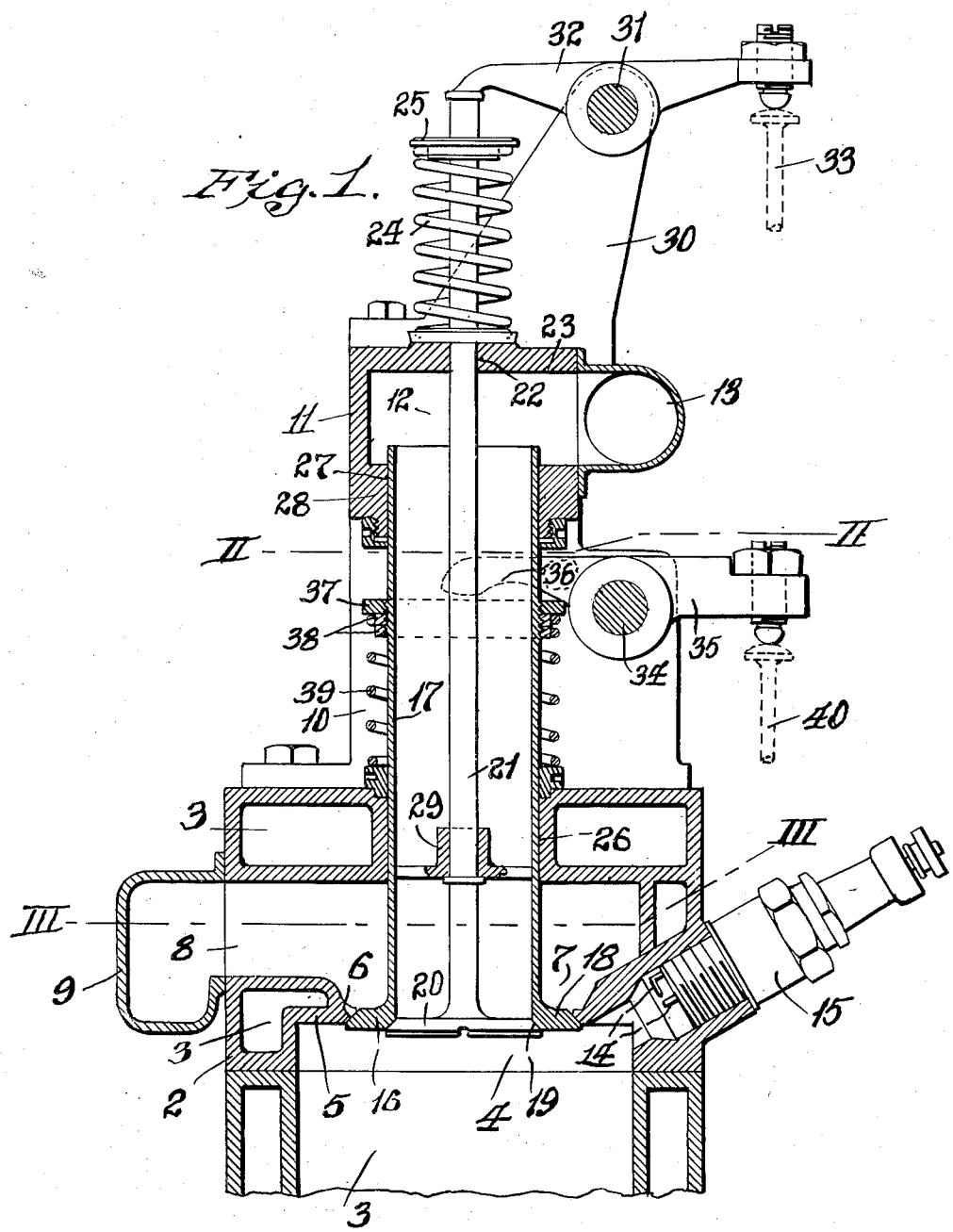
Figure 1 is a transverse vertical section taken through the upper portion of an internal combustion motor showing this invention and the improvements thereto.

Referring by numerals to the accompanying drawings 1 designates the upper portion of the cylinder of an internal combustion motor and mounted thereon is the cylinder head 2, said cylinder head being cored so as to provide a water jacket 3. Formed in the cylinder head is a combustion chamber 4 having a top wall 5 and formed in said wall is an exhaust valve seat 6 and formed in the cylinder head above the combustion chamber 4 is an exhaust chamber 7 having an outlet 8 which communicates with the exhaust manifold 9.

Mounted on the cylinder head 2 are a pair of legs 10 of which only one is shown, said legs being for the support of a gaseous fuel chest 11 which is disposed parallel to the cylinder head 2, and formed in said chest is a fuel chamber 12 and in communication with said chamber on one side of the chest 11 is an intake manifold 13.

In communication with the combustion chamber 4 are the electrodes 14 of a spark plug 15 and cooperable with the exhaust valve seat 6 is an exhaust valve 16 having a relatively large diametered hollow stem 17 and concentrically formed in the head portion 18 of the exhaust valve 16 is an inlet valve seat 19. Cooperable with the inlet valve seat 19 is an inlet valve 20 having a stem 21 which is extended through the hollow stem 17 of the exhaust valve 16, said stem 21 passing through an opening 22 which is formed in the top wall 23 of the fuel chest 11, said opening 22 forming an upper bearing for the valve stem 21, and mounted over the extending end of the stem 21 is a coil spring 24 which is engaged between a washer 25 which is securely mounted on the stem 21 and the top wall 23 of the fuel chest 11.

The hollow stem 17 is provided with a bearing 26 in the cylinder head 2 and there being an upper disposed bearing 27 for said stem formed in the lower wall 28 of the fuel chest 11, said valve stem projecting above the wall 28 and into the chamber 12 of the fuel chest. A lower bearing or guiding element 29 for the inlet valve stem 21 is secured within the hollow valve stem 17.

Secured on top of the fuel chest 11 are a pair of brackets 30 and supported in said brackets is a stationarily held shaft 31 and rockably mounted on said shaft is a rocker arm 32 having one end for cooperable engagement with the upper end of the inlet valve stem 21 and a pushing element 33 cooperable with the opposite end of said rocker arm. Supported between the legs 10 is a transversely disposed stationarily held shaft 34 and swingable on said shaft is a rockable member 35 having a pair of pushing fingers 36 extending from one side which are disposed in straddling relation outwardly of the hollow stem 17, and secured on said stem 17 adjacent and beneath the fingers 36 is a collar 37 which is held in position on said valve stem by the lock nuts 38 and disposed between said collar and the cylinder head 2 is a coil spring 39. Cooperable with one end of the rocking member 35 is an operating element 40 therefor.

In the operation of this combined inlet and exhaust valve, on the intake stroke of the piston in the cylinder 1, the element 33 is operated so that the rocker arm 32 will force the inlet valve stem 21 downwardly thereby pushing the inlet valve 20 from its seat 19 and the gaseous fuel from the chamber 12 of the chest 11 will be entrained through the hollow stem 17 of the exhaust valve into the cylinder 1. At the time of completion of the downward stroke of the piston the operation on the element 33 will be reversed and the spring 24 will operate on the valve stem 21 to close the intake valve 20 on its seat 19. After the force of the explosion thrust has occurred upon the piston, and the piston is about to return on its upward travel, the element 40 will operate upon the rockable member 35 so that the fingers 36 of said member will engage against the collar 37 and force the hollow valve stem 17 of the exhaust valve 16 downwardly thereby moving said valve from engagement with its seat 6 thereby permitting the burnt gases to be expelled through the exhaust opening provided by the valve seat 6 into the exhaust chamber 17 from where the gases will be further expelled in the exhaust manifold 9. Immediately upon completion of the exhausting stroke of the piston, the spring 39 will be permitted to act upon the collar 37 and push the valve stem 17 upwardly thereby moving the valve 16 to closing position against its seat 6.

Inasmuch as the exhaust valve of an internal combustion motor becomes highly heated, the hollow stem consequently will radiate the heat from the valve and inasmuch as the hollow stem is thus heated, the gaseous fuel contained in the hollow stem ready for admittance into the cylinder will always be in a heated state which is desirable, and inasmuch as the gaseous vapor entrained in the hollow stem is a product of gasoline which is volatilizable, the diffusing thereof by reason of the air-mix therewith due to atomization by the carburetor, the effect thereof will tend to cool the hollow stem 17 and consequently the exhaust valve 16 thus eliminating the heretofore excessive heating of the exhaust valve.

It is to be noted that by reason of the inlet valve 20 being nested within the exhaust valve 16 that provision is made whereby the diameter of the exhaust valve can be made relatively large thereby providing a sufficiently large discharge opening for the burnt gases on the expelling stroke of the piston, and in consequence of the larger exhaust valve it is obvious that a larger diametered inlet valve is permitted which will provide a larger inlet opening to be made when the inlet valve 20 is open and in which a greater supply of gaseous fuel can be admitted into the cylinder on the intake stroke of the piston when the motor is operating at a higher speed.

What I claim is:—

1. In an internal combustion motor, the combination of an exhaust valve having a hollow stem, an inlet valve carried by said exhaust valve, an inlet manifold with which the upper end of the hollow stem of said exhaust valve is cooperable, a collar secured to the hollow stem of said exhaust valve intermediate of its length, and a bifurcated member engaging said collar for operating said exhaust valve.

2. In an internal combustion motor, the combination of a cylinder, of an inlet manifold, an exhaust valve having a hollow stem forming means of communication from said manifold between said cylinder, an inlet valve for intermittently cutting off communication from the inlet manifold to the cylinder, and means for operating said exhaust valve having cooperable engagement with the hollow stem thereof intermediate of its length.

3. In an internal combustion motor, the combination of a cylinder, a head for said cylinder, a fuel chest, an exhaust valve located in said cylinder head having a hollow stem extending into said chest, a collar secured to the hollow stem of said exhaust valve intermediate of its length and operating means for said exhaust valve having cooperable engagement with said collar.

4. In an internal combustion motor, the combination of a cylinder, a head for said cylinder, a fuel chest disposed above said cylinder head and spaced therefrom, an exhaust valve located in said cylinder head having a hollow stem extending into said chest, and an inlet valve cooperable with the hollow stem of said exhaust valve.

5. In an internal combustion motor, the combination of a cylinder, a head for said cylinder, a fuel chest paralleling said head and disposed a distance therefrom, an exhaust valve cooperable in said head having a hollow stem extending into said chest, an inlet valve borne by said exhaust valve, and separately operable means for each of said valves, the operating means of said exhaust valve cooperably engaging the hollow stem thereof intermediate of its length.

6. In an internal combustion motor, the combination of an exhaust valve having a hollow stem, an inlet valve carried by said exhaust valve having the stem thereof extend through the hollow stem of said exhaust valve, an inlet manifold in communication with the hollow stem of said exhaust valve and means for operating said valves, the operating means of said exhaust valve cooperably engaging the hollow stem thereof intermediate of its length.

HARRY KASTRUP.